No. 817,370. PATENTED APR. 10, 1906.
W. HECKART.
SHOCK LOADER.
APPLICATION FILED MAY 8, 1905.
3 SHEETS—SHEET 1.
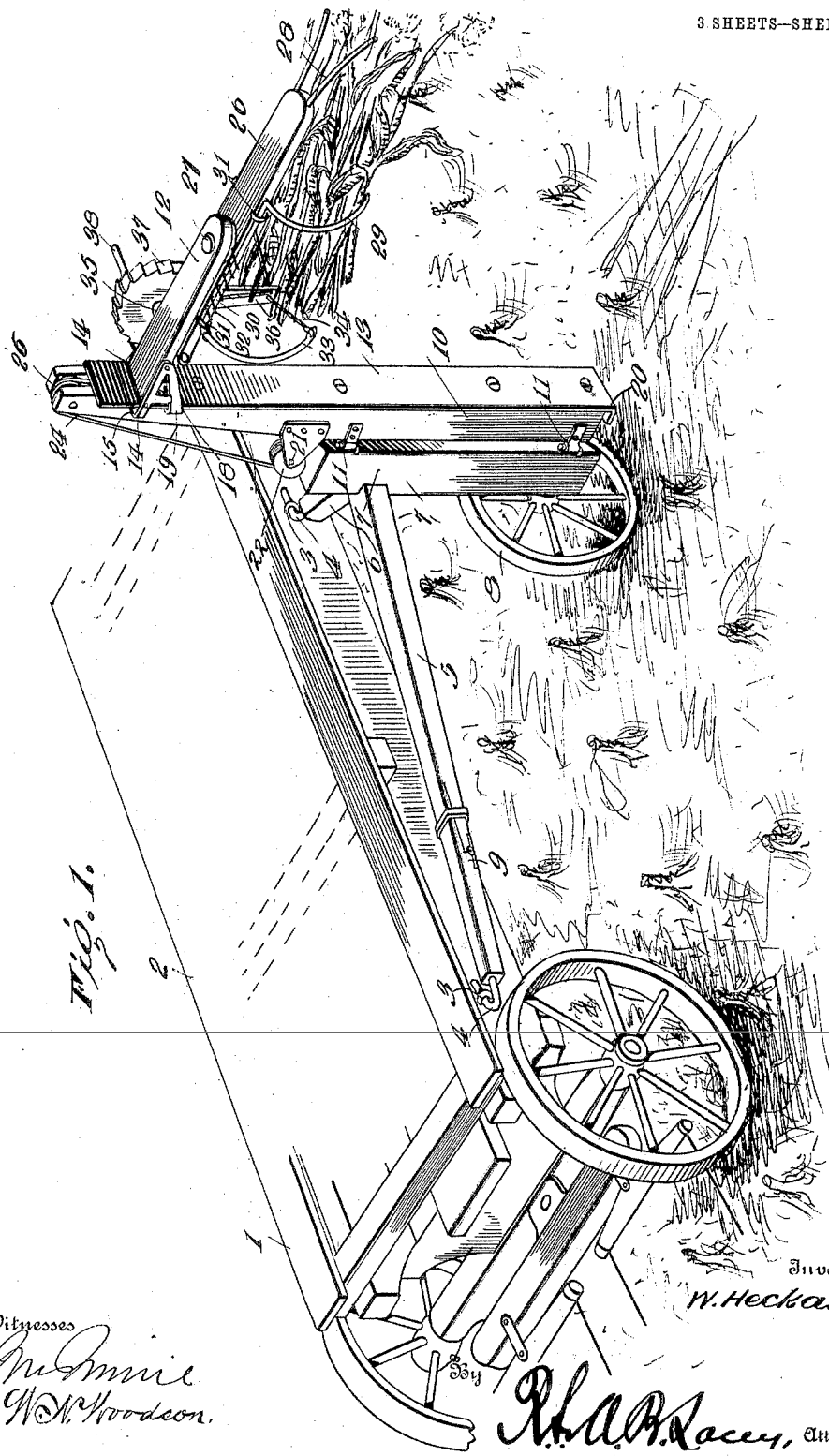

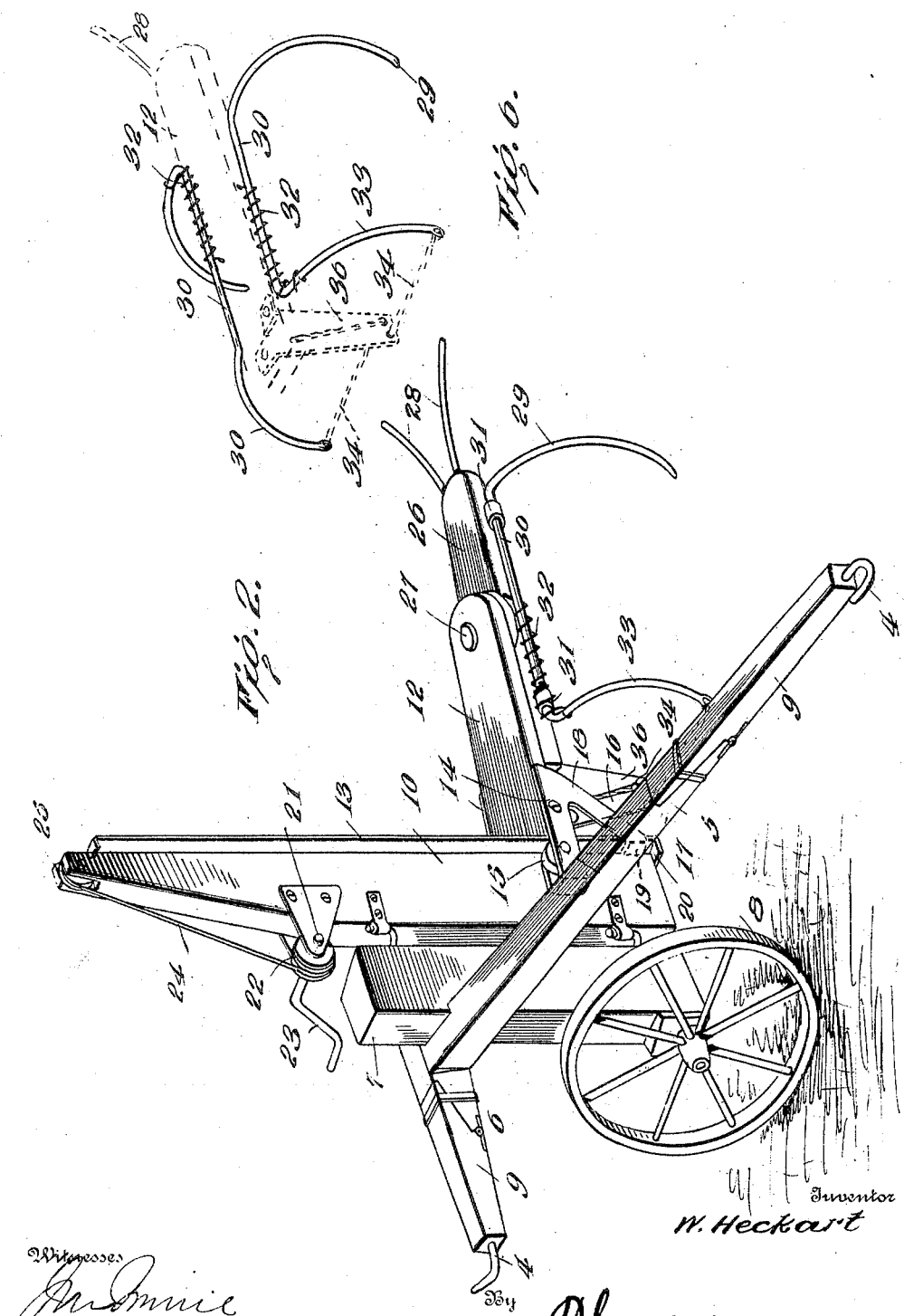

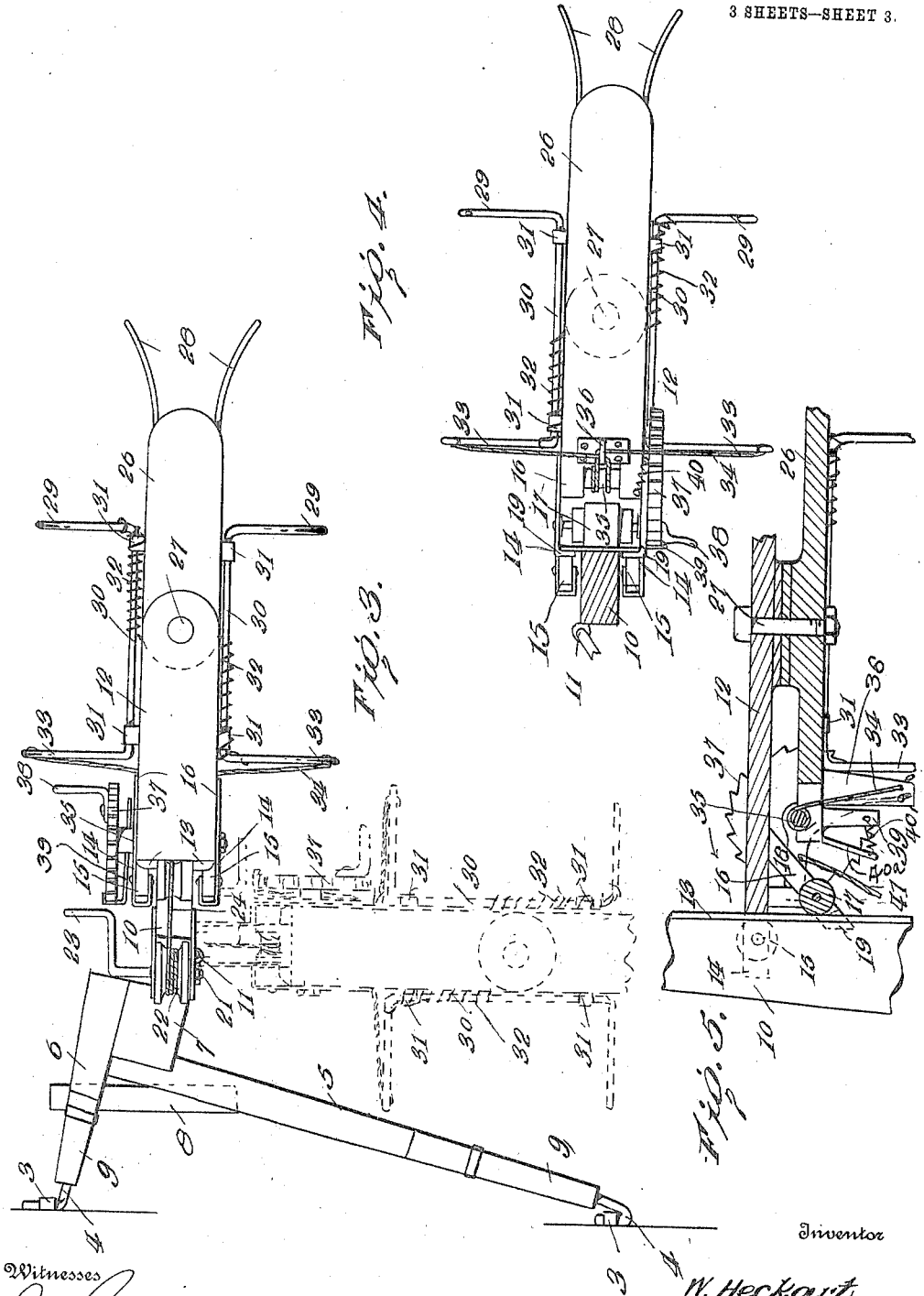

UNITED STATES PATENT OFFICE.

WILLIAM HECKART, OF BRADNER, OHIO.

SHOCK-LOADER.

No. 817,370.  Specification of Letters Patent.  Patented April 10, 1906.

Application filed May 8, 1905. Serial No. 259,408.

*To all whom it may concern:*

Be it known that I, WILLIAM HECKART, a citizen of the United States, residing at Bradner, in the county of Wood and State of Ohio, have invented certain new and useful Improvements in Shock-Loaders, of which the following is a specification.

This invention consists of novel loading apparatus particularly designed for agricultural purposes to be used in the field for lifting shocks of corn, fodder, or the like from the ground and placing the same upon a vehicle for facilitating transportation thereof from one point to another.

The invention is of course adapted for transferring bundles or shocks of any kind from the ground to a vehicle or similar support, and a special feature of the invention is comprised in the provision of novel elevating mechanism and operating means therefor.

The invention also resides in the special form of support carrying the whole loader apparatus, said support being adapted for attachment to a hay-wagon or the like and mounted upon a single ground-wheel, enabling the same to be moved from one place to another without difficulty.

Further, the invention resides in the use of a peculiarly-mounted shock-carrying bar, forming a part of the elevating mechanism of the invention, said shock-carrying bar being so mounted as to permit of reversibly disposing the shocks upon the wagon or vehicle upon which they are loaded. As the lower or butt end of the corn-shock is larger than the upper end, it will be noted that mechanism for so disposing the shocks that they will be evenly loaded upon the vehicle is particularly advantageous in a practical device of this class.

For a full description of the invention and the merits thereof and also to acquire a knowledge of the details of construction of the means for effecting the result reference is to be had to the following description and accompanying drawings, in which—

Figure 1 is a perspective view showing the invention as when in actual use, the same being connected with a hay-wagon of ordinary construction, the elevating-arms and bar being shown partially raised or elevated. Fig. 2 is a perspective view of the invention, the shock-carrying bar being shown in the position normally assumed thereby preparatory to loading a shock or bundle. Fig. 3 is a top plan view, dotted lines indicating the position of the horizontal arm and shock-carrying bar as the latter are being turned to place the bundle or shock upon the vehicle. Fig. 4 is a bottom plan view of the horizontal arm and shock-carrying bar, bringing out more clearly the operating mechanism for the shock-carrying fingers, the upright being shown in section. Fig. 5 is a vertical longitudinal sectional view, partially broken away, showing the mounting of the shock-carrying bar upon the horizontal arm by which it is raised and lowered. Fig. 6 is a detail view of the shock-engaging fingers and the operating mechanism therefor, connecting ropes being shown in dotted lines as well as the pendent standard of the horizontal arm.

Corresponding and like parts are referred to in the following description and indicated in all the views of the drawings by the same reference characters.

The vehicle 1 shown in the drawings is a common form of hay-wagon, the hay-rack 2 being supported thereby in the usual manner. Operated from a side of the wagon-body are U-shaped coupling members 3, and said members are engaged by hooks 4, carried by the supporting-frame of the loader comprising this invention. The supporting-frame of the loader comprises a longitudinal bar 5, a bar 6 projecting at an angle to the bar 5 and extending therefrom at the rear end of the latter, and a vertical post 7, rigid with the members 5 and 6 aforesaid, the latter being firmly secured thereto. The post 7 carries the ground-wheel 8, which is suitably mounted at the lower end of the post 7. The main operating mechanism and elevating means forming a part of this invention are carried by the post 7, and in order that the supporting-frame of the loader may be held upright when detached from the wagon 1 the outer ends of the bars 5 and 6 of said frame are provided with pivoted members 9, adapted by pivotal movement to be thrown downwardly to form legs coöperating with the ground-wheel 8 to support the device in a manner above mentioned. The members 9 of the bars 5 and 6 are provided with the hooks 4 before described, and when these members 9 are connected with the wagon said members are approximately in alined positions with regard to the bars 5 and 6 by which they are carried.

Pivoted to the vertical post 7 or hingedly secured thereto for turning movement is a vertical upright or mast 10, the pivotal connections between the upright and the post 7 being indicated at 11. The upright 10 supports a horizontal arm 12, which projects outwardly therefrom, said arm 12 being adapted to be raised and lowered by reason of the manner of connecting the same with the said upright 10. The upright 10 is provided upon a side thereof with a vertical guide-plate 13, and spaced guide members 14 project rearwardly from the rear or inner extremity of the arm 12, having rollers 15 to engage the guide-plate 13 upon the rear side of the latter, so as to afford a connection between the parts 10 and 12, admitting of free vertical movement of the latter. In order that the arm 12 may not sag at its outer end and to also facilitate the free vertical movement thereof, a bracket 16 is projected from the under side of the arm near its inner end, said bracket embodying spaced vertical sides carrying a roller 17, which engages the outer surface of the plate 13 to reduce the friction between the arm 12 and the upright 10 as the arm is raised and lowered. Diagonally-arranged braces 18 connect the arm 12 with the sides of the bracket 16, and the lower extremities of the braces 18 are formed with extensions 19, projecting in rear of the plate 13 at the vertical edges thereof. The extensions 19 are adapted to abut with a flange 20 at the lower extremity of the plate 13, so as to limit the downward movement of the arm 12. The upright 10 has a windlass-shaft 21 mounted in suitable bearings thereon, and this shaft carries the drum 22 and is operated by a crank-handle 23. A cable or rope 24 is adapted to wind around the drum 22, being secured thereto at one end, said cable passing over a pulley 25 at the upper end of the upright 10 to its point of connection with the arm 12. The operator of the invention stands upon the supporting-frame adjacent the shaft 21, so that he may readily operate this shaft and wind the connection 24 upon the drum 22 to thereby raise and lower the arm 12.

Any suitable pawl-and-ratchet mechanism may be used to prevent turning of the drum 22 when the load is being carried by the arm 12.

The arm 12 carries the shock-carrying bar 26, the latter being pivoted at a point about intermediate its ends to the outer end portion of the arm, as indicated at 27. Extending from the outer extremity of the shock-carrying bar 26, and preferably at an angle thereto, are spaced teeth or tines 28, which are adapted to strike a shock as the loader advances thereto, so as to overturn the same and admit of ready engagement of the shock-engaging fingers 29, carried by the bar 26 therewith. The shock-engaging fingers 29 are curved in their length and project from opposite sides of the bar 26, extending downwardly therefrom. Said fingers 29 are projected from shafts 30, which are mounted in suitable bearing-brackets 31 at opposite sides of the bar 26, said shafts 30 being arranged longitudinally of the bar. A spring 32 is attached at one end to each shaft 30 and at its opposite end to the bar 26, said spring being preferably of the coil type, so as to normally coact with the respective shafts to force the fingers 29 apart into a position in which they will be open ready to embrace a shock received therebetween. The fingers 29 extend from the shafts 30 at the outer ends of said shafts, and extending from the inner ends of the shafts are crank-arms 33, said arms being connected by flexible connections, such as ropes 34, with a transverse windlass-shaft 35, mounted upon the inner end of the shock-carrying bar 26. The bar 26 is provided with a depending standard 36, projecting downwardly from the under side thereof near the inner end of the bar, and this standard 36 is provided with openings at its lower extremity, through which the connections 34 pass. The connections 34 extend from the points of attachment with the crank-arms 33 through a respective opening in the standard 36 and thence upwardly through an opening in the bar 26. The shaft 35 has a ratchet-wheel 37 mounted upon one end thereof, and a crank-handle 38 extends from a side of the ratchet-wheel. When the crank-handle 38 is turned by the operator, the shaft 35, winding upon the connections 34, will pull the crank-arms 33 toward each other and will cause the shock-engaging fingers 29 to close together, the above operation being performed when said engaging fingers are about to embrace a shock preparatory to loading the latter upon the vehicle. In order to hold the fingers 29 closed after the latter have been engaged with the shock, a bell-crank pawl 39 is pivoted to the bar 26 adjacent the wheel 37, and this pawl is adapted to engage the wheel to hold the latter from backward rotation, the springs 32 of course tending to force the members 29 apart and place tension upon the two connections 34 in a manner readily apparent. A spring 40 is connected at one end with the pawl 39 and at the other end with an arm 40ª and coacts with the pawl 39 to hold the same in engagement with the wheel 37, and a hand rope or connection 41 is connected with the pawl, so that the operator of the loader may readily disengage the latter from the wheel 37 to permit separation of the fingers 29 in allowing the shock to drop therethrough.

When the loader is not in use, the members 9 of the frame-bars 5 and 6 are of course lowered by breaking joint with said bars, and thereby form legs, which coöperating with the ground-wheel 8 will properly support the loader. To use the loader, it is only necessary to throw the members 9 up and connect the hooks 4 thereof with the wagon-body. The normal portion of the horizontal arm 12 will of course be at the lower extremity of the upright 10, said arm being so arranged as to project laterally from the wagon or vehicle, as shown most clearly in full lines in Figs. 2 and 3. A shock having been overturned, the loader is so positioned that the shock-engaging fingers 29 will be arranged at opposite sides of the shock, whereupon the operator by turning the shaft 35 will draw the crank-arms 33 together and cause the fingers 29 to close about and firmly embrace the shock in an obvious manner. The above having been done, the crank-shaft 21 is turned and the connection 24 is wound upon the drum 22, so as to gradually raise the arm 12 until the latter has reached a position about as shown in full lines in Fig. 1. The arm 12 is now swung laterally, the upright 10 turning in the above operation until said arm assumes a position transversely of and above the hay-rack 2, which is carried by the wagon 1. The operator now actuates the rope 41, connected with the pawl 39, engaging the ratchet-wheel 37, and said pawl is thereby disengaged from the ratchet-wheel, permitting the springs 32 under the normal tension thereof to force the crank-arms 33 apart and separate the fingers 29, the shock carried thereby being dropped upon the hay-rack in the customary way. As premised upon hereinbefore, it is desired in order to load the vehicle evenly that the shocks be disposed thereupon with the butts reversed, and the mounting of the shock-carrying bar 26 is such as to permit the above. For instance, in order that the shock may be dropped to the wagon with the butt-end reversed it is only necessary that the operator swing or turn the shock-carrying bar 26 upon its pivot 27 until the said bar is half-way around, whereupon the connection 41 may be actuated to drop the shock in the manner before set forth.

Having thus described the invention, what is claimed as new is—

1. In a shock-loader, the combination of a support, a horizontal arm supported thereby, means for elevating the arm, and a shock-carrying bar movably mounted upon said arm.

2. In a shock-loader, the combination of a support, a vertical upright arranged to turn upon the support, a horizontal arm carried by the said upright, means for elevating the arm, and a shock-carrying bar movably mounted upon said arm.

3. In a shock-loader, the combination of a support, a horizontal arm supported thereby, means for elevating the arm, and a reversible shock-carrying bar mounted upon said arm.

4. In a shock-loader, the combination of a support, a horizontal arm supported thereby, means for elevating the arm, and a shock-carrying bar pivotally mounted upon said arm.

5. In a shock-loader, the combination of a support, a horizontal arm supported thereby, means for elevating the arm, a shock-carrying bar pivotally mounted upon said arm, shock-engaging fingers projected from the shock-carrying bar, and operating mechanism for said fingers mounted upon the bar.

6. In a shock-loader, the combination of a support, a horizontal arm supported thereby, means for elevating the arm, a shock-carrying bar pivotally mounted upon said arm, shock-engaging fingers projected from the shock-carrying bar, means normally tending to separate said fingers, means for forcing the fingers together to embrace the shock, and means for locking the fingers together.

7. In a shock-loader, the combination of a supporting-frame embodying bars, a post carried by said bars, a ground-wheel mounted on said post, pivoted members carried by the bars of the frame for connection with a vehicle or the like, said pivoted members being adapted to be lowered to form legs, and shock-carrying means mounted upon the post aforesaid.

8. In a shock-loader, the combination of a supporting-frame, a vertical upright pivoted to said frame, a horizontal arm movable vertically of said upright, means carried by the supporting-frame for raising and lowering said arm, a shock-carrying bar movably mounted upon the arm, shock-engaging fingers carried by said bar, spring means normally tending to separate said fingers, means for locking the fingers closed, and operating means for permitting separation of the fingers under the tension of the spring means aforesaid.

9. In a shock-loader, the combination of a supporting-frame, a vertical upright pivotally mounted upon said frame, a horizontal arm vertically movable upon said upright, means for raising and lowering said arm, a shock-carrying bar pivoted to the horizontal arm, shafts journaled upon the shock-carrying bar, shock-engaging fingers projected from said shafts, crank-arms extending from the shafts, a windlass-shaft carried by the shock-carrying bar, and connecting means between the crank-arms and the windlass-shaft aforesaid.

10. In a shock-loader, the combination of a supporting-frame, a vertical upright pivoted thereto, a horizontal arm movable vertically of the upright, means for raising and lowering said arm, a shock-carrying bar movably mounted upon the arm, shock-engaging fingers projected from the shock-carrying bar, and a plurality of teeth or tines extending from said shock-carrying bar and arranged to overturn a shock with which they come into contact.

In testimony whereof I affix my signature in presence of two witnesses.

WILLIAM HECKART. [L. S.]

Witnesses:
    CHARLES D. JAMES,
    F. W. PARMALEE.